(12) United States Patent
Nalluri et al.

(10) Patent No.: US 10,303,902 B2
(45) Date of Patent: *May 28, 2019

(54) HARDWARE ASSIST FOR PRIVILEGE ACCESS VIOLATION CHECKS

(71) Applicant: INTEL CORPORATION, Santa Clara, CA (US)

(72) Inventors: Hema C. Nalluri, Hyderabad (IN); Aditya Navale, Folsom, CA (US); Murali Ramadoss, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,644

(22) Filed: Apr. 24, 2017

(65) Prior Publication Data

US 2017/0357831 A1 Dec. 14, 2017

Related U.S. Application Data

(63) Continuation of application No. 13/649,798, filed on Oct. 11, 2012, now Pat. No. 9,633,230.

(51) Int. Cl.
*G06F 21/74* (2013.01)
*G06F 21/84* (2013.01)
*G06T 15/00* (2011.01)

(52) U.S. Cl.
CPC .............. *G06F 21/74* (2013.01); *G06F 21/84* (2013.01); *G06T 15/005* (2013.01)

(58) Field of Classification Search
CPC ........ G06F 21/74; G06F 21/84; G06T 15/005
See application file for complete search history.

(56) References Cited

U.S. PATENT DOCUMENTS 7,444,637 B2 10/2008 Pronovost et al.
7,474,312 B1 * 1/2009 Rohrer ...................... G06F 3/14
345/530

(Continued)

OTHER PUBLICATIONS

Intel, "Intel® OpenSource HD Graphics Programmer's Reference Manual (PRM)", vol. 1 Part 2: Graphics Core™—MMIO, Media Registers, and Programming Environment (Ivy Bridge), for the 2012 Intel® Core™ Processor Family, Revision 1.0, May 2012, pp. 1-61.

(Continued)

*Primary Examiner* — Maurice L. McDowell, Jr.
(74) *Attorney, Agent, or Firm* — Finch & Maloney PLLC

(57) ABSTRACT

Techniques are disclosed for processing rendering engine workload of a graphics system in a secure fashion, wherein at least some security processing of the workload is offloaded from software-based security parsing to hardware-based security parsing. In some embodiments, commands from a given application are received by a user mode driver (UMD), which is configured to generate a command buffer delineated into privileged and/or non-privileged command sections. The delineated command buffer can then be passed by the UMD to a kernel-mode driver (KMD), which is configured to parse and validate only privileged buffer sections, but to issue all other batch buffers with a privilege indicator set to non-privileged. A graphics processing unit (GPU) can receive the privilege-designated batch buffers from the KMD, and is configured to disallow execution of any privileged command from a non-privileged batch buffer, while any privileged commands from privileged batch buffers are unrestricted by the GPU

22 Claims, 7 Drawing Sheets

(56) References Cited

U.S. PATENT DOCUMENTS

| | | | |
|---|---|---|---|
| 9,633,230 B2* | 4/2017 | Nalluri | G06F 21/74 |
| 2003/0122835 A1* | 7/2003 | Doyle | G06T 1/60 |
| | | | 345/537 |
| 2003/0140179 A1 | 7/2003 | Wilt et al. | |
| 2004/0160446 A1* | 8/2004 | Gosalia | G06F 9/4843 |
| | | | 345/503 |
| 2005/0283602 A1* | 12/2005 | Vembu | G06F 21/53 |
| | | | 713/150 |
| 2007/0103476 A1* | 5/2007 | Huang | G06T 15/005 |
| | | | 345/522 |
| 2010/0031340 A1 | 2/2010 | Batke et al. | |
| 2013/0162661 A1 | 6/2013 | Bolz et al. | |
| 2013/0247067 A1 | 9/2013 | Schmit et al. | |
| 2013/0346718 A1* | 12/2013 | Meshchaninov | G06F 12/0623 |
| | | | 711/164 |
| 2014/0104287 A1 | 4/2014 | Nalluri et al. | |

OTHER PUBLICATIONS

Intel, "Intel® OpenSource HD Graphics PRM", vol. 1 Part 4: Graphics Core—Video Codec Engine, for the all new 2010 Intel Core Processor Family, Programmer's Reference Manual (PRM), Revision 1.0, Mar. 2010, pp. 1-42.

* cited by examiner

| Command Type | Op Code | 2nd Level Batch Buffer | Reserved | Add Offset Enable | Predication Enable | Reserved | Non-Priv | BB Encrypted Mem Read Enable | Clear Command Buffer Enable | Resource Streamer Enable | Reserved | Address Space Indicator | DWord Length |
|---|---|---|---|---|---|---|---|---|---|---|---|---|---|
| 31:29 | 28:23 | 22 | 21:17 | 16 | 15 | 14 | 13 | 12 | 11 | 10 | 9 | 8 | 7:0 |

Fig. 4a

| Batch Buffer Start Address | Reserved |
|---|---|
| 31:2 | 1:0 |

Fig. 4b

HARDWARE ASSIST FOR PRIVILEGE ACCESS VIOLATION CHECKS

This application is a continuation of U.S. patent application Ser. No. 13/649,798 filed on Oct. 11, 2012 (now U.S. Pat. No. 9,633,230), the content of which is herein incorporated by reference in its entirety.

BACKGROUND

Graphics processing in a computing environment such as a desktop computer or workstation, laptop or tablet, or game console generally entails a number of complex operations. Such operations include, for example, those with respect to ensuring that images are properly and timely rendered, as well as those with respect to ensuring security is maintained against malicious attacks. There are a number of non-trivial issues that arise in the context of such operations.

BRIEF DESCRIPTION OF THE DRAWINGS

FIGS. 4a-b illustrate a batch buffer start command that can be used to initiate the execution of commands stored a batch buffer, in accordance with an embodiment of the present invention.

DETAILED DESCRIPTION

Figure 1:
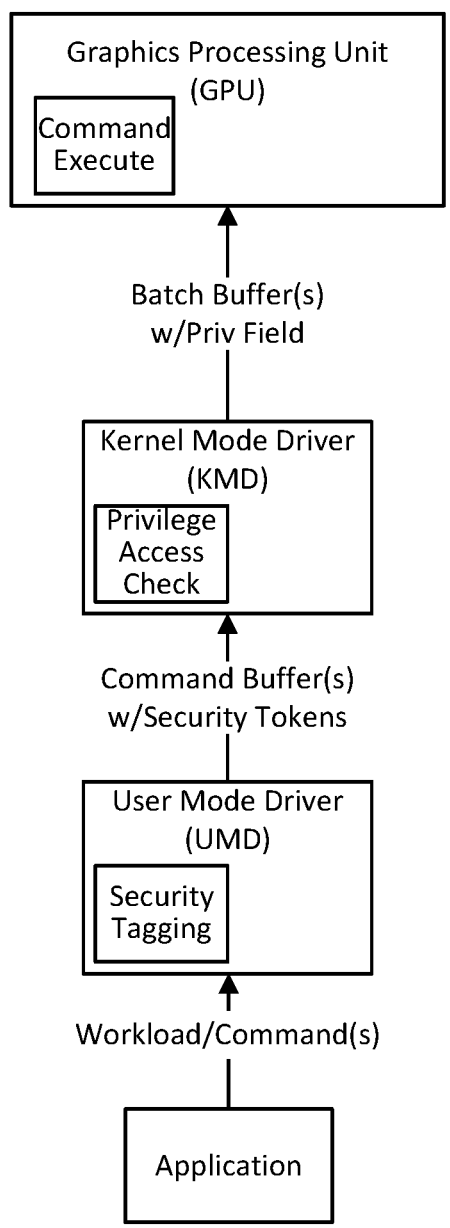
FIG. 1 illustrates a graphics processing system configured in accordance with an embodiment of the present invention.

Techniques are disclosed for processing rendering engine workload of a graphics system in a secure fashion, wherein at least some security processing of the workload is offloaded from software-based security parsing to hardware-based security parsing. In some embodiments, commands from a given application are received by a user mode driver (UMD), which is configured to generate a command buffer delineated into privileged and/or non-privileged command sections. The delineated command buffer can then be passed by the UMD to a kernel-mode driver (KMD), which is configured to parse and validate only privileged buffer sections, but to issue all other batch buffers with a privilege indicator set to non-privileged. A graphics processing unit (GPU) can receive the privilege-designated batch buffers from the KMD, and is configured to disallow execution of any privileged command from a non-privileged batch buffer, while any privileged commands from privileged batch buffers are unrestricted by the GPU.

General Overview

As previously explained, there are a number of non-trivial issues that arise in the context of graphics processing, particularly with respect to ensuring security is maintained against malicious attacks. For instance, a GPGPU (General-Purpose computing on Graphics Processing Units) generally includes a user-mode and a kernel-mode. The User-mode Driver (UMD) receives commands from a given application, and submits a command buffer (workload) to Kernel-mode Driver (KMD) for execution. The KMD then submits the UMD provided command buffers as batch buffers to the Graphics Processing Unit (GPU) for execution. Command buffers submitted by UMD typically include privileged commands (e.g., such as memory writes, memory-mapped input/output (MMIO) writes, or any other privileged commands) which can be used to maliciously interfere or otherwise tamper with system memory and configuration registers causing system instability. To avoid malicious attacks by UMD-provided command buffers, the KMD parses the command buffer for illegitimate privilege access commands and discards them. Such KMD-based command buffer security parsing consumes considerable central processing unit (CPU) bandwidth, which in turn consumes power and adds delay in submission of the command buffers to GPU. Thus, KMD-based command buffer security parsing can cause both excessive power consumption and performance degradation.

Thus, and in accordance with an embodiment of the present invention, security processing of graphics workload is modified to reduce CPU cycles and power consumption. In particular, and in accordance with one such embodiment, at least a portion of privilege access checks on the workload are offloaded from the KMD (which carries out software-based processing) to the GPU (which carries out hardware-based processing). In one example case, this is achieved by adding an additional check in the GPU with respect to parsing commands from KMD-based batch buffers. As will be appreciated in light of this disclosure, the additional functionality added in the GPU is not gate count intensive and hence saves on KMD bandwidth which in turn yields power and performance enhancement (e.g., lower power consumption and CPU cycles, and lower latency).

In more detail, command buffers submitted by the UMD can have privileged commands which are legitimate and therefore can be allowed to support certain application programming interface (API) functions. The KMD can also submit command buffer(s) on its own for its routines (e.g., paging, resource management, scheduling, etc) which will have privileged commands (e.g., MMIO write to registers in 3D engine, Draw Indirect, etc). In accordance with an embodiment of the present invention, the UMD, KMD and GPU collectively operate to distinguish between legitimate and illegitimate commands in the command buffers. Various protocols that can be used between the UMD, KMD, and GPU will be apparent in light of this disclosure.

For instance, and in accordance with one example embodiment, the UMD can submit workload to the KMD as command buffer that includes privileged and/or non-privileged commands. The UMD is programmed or otherwise configured to tag the sections in the command buffer as privileged or non-privileged by, for example, adding a token at the beginning of each section. In some such embodiments, the token indicates whether that section is privileged or non-privileged, and an offset of the next token. Upon encountering a token that indicates a non-privileged command, the KMD submits the corresponding section of the command buffer as a non-privileged batch buffer to the GPU. In some cases, the KMD can be programmed or otherwise configured to jump to next token based on the offset indicated in the current token. Upon encountering a token that indicates a privileged command section, the KMD is configured to parse that section for illegitimate privileged commands and discard them. The KMD can then submit a validated command buffer section as a privileged batch buffer to the GPU. Thus, only the portion of the graphics workload designated as privileged is validated by the KMD.

The KMD can submit the workload to the GPU as batch buffers. In one example case, the KMD can be programmed or otherwise configured to tag the batch buffers as privileged or non-privileged by, for instance, using a field provisioned in the batch buffer start command. In some such embodiments, the GPU is programmed or otherwise configured to not allow any privileged command execution (e.g., memory writes to the global graphics translation table (GGTT) memory, updates to the GGTT, MMIO writes, etc) from a non-privileged batch buffer. In some such cases, the GPU does not place any restrictions on parsing privileged commands from privileged batch buffers, as those particular batch buffers have already been parsed and validated by the KMD.

The frequency of using privileged commands in the command buffer is relatively sparse for typical workloads. As such, the techniques provided herein effectively result in the KMD spending a relatively small amount of time in validating the relatively small privileged portion of the command buffer submitted by the UMD, thereby resulting in power/performance enhancement. Numerous variations and implementations will be apparent in light of this disclosure.

System Architecture

FIG. 1 illustrates a graphics processing system configured in accordance with an embodiment of the present invention. As can be seen, the system generally includes a user-mode domain and a kernel-mode domain. On the user-mode side, the system includes a User-mode Driver (UMD) configured with a security tagging module. The UMD is capable of receiving graphics workload comprising commands from a given application and outputting a command buffer(s) configured with tokens that indicate privileged and/or non-privileged commands in the buffer. On the kernel-mode side, the system includes a Kernel-mode Driver (KMD) configured with a privilege access check module, and a Graphics Processing Unit (GPU) configured with a command execute module. The KMD is capable of receiving command buffers having security tokens from the UMD, validating commands designated as privileged, and outputting batch buffer start commands that designate security status (privileged or non-privileged) of the corresponding batch buffer. The GPU is capable of receiving batch buffer start commands from the KMD, and will execute privileged commands from privileged buffer section as well as non-privileged commands, but will prohibit execution of privileged commands from non-privileged buffers.

As will be appreciated, typical components and functional modules of a graphics processing system are not shown, such as the KMD scheduler and other such rendering engine components, as well as various blitter engine and media engine components. In addition, other embodiments may have one or more of the components shown integrated with other components. For instance, the UMD along with the security tagging module may be integrated into one or more conventional modules of the UMD. Likewise, the KMD along with the privilege access check module may be integrated into one or more conventional modules of the KMD and/or into the GPU as one or more embedded routines. Numerous such variations and embodiments will be apparent in light of this disclosure, and the claimed invention is not intended to be limited to the specific examples depicted in the figures.

The given application can be any application that generates commands suitable for execution by a graphics processing system, and in particular by the GPU. The commands (or workload) can be passed from the application to the UMD as conventionally done or with a custom or otherwise proprietary protocol if so desired. In other embodiments, the application may communicate with one or more intervening modules and/or components one or more of which in turn communicate with the UMD. In a more general sense, any user-mode configuration that allows the UMD to receive a user-mode command buffer or information sufficient to allow for the generation of a command buffer can be used in accordance with an embodiment of the present invention.

In some embodiments, the UMD is configured to receive the workload and generate a command buffer as is normally done, using any number of known and/or custom buffer generation techniques and architecture. In other embodiments, the UMD may receive a pre-established command buffer, such as one generated by the application itself and/or one or more intervening modules. However, and in accordance with an embodiment of the present invention, the UMD is further configured with the security tagging module programmed or otherwise configured to delineate which commands in the buffer are privileged and which commands in the buffer are non-privileged. In one specific embodiment, this tagging is carried out by to inserting security tokens and buffer section end designators before and after (respectively) each buffered command. In general, some user-mode commands of a given graphics processing system instruction set may be privileged and other user-mode commands of that instruction set may be non-privileged. Thus, the command buffer may include any combination of privileged and/or non-privileged commands, and need not necessarily include both privileged and non-privileged commands. The format and structure of the user-mode command buffer may have a number of forms as will be appreciated in light of this disclosure. One example will be discussed with reference to FIG. 2.

In some embodiments, the KMD is configured to directly receive the privilege delineated command buffer from the UMD. In other embodiments, the KMD may receive the privilege delineated command buffer from one or more intervening components and/or modules. In addition, the KMD of the example embodiment shown in FIG. 1 is further configured with the privilege access check module, which is programmed or otherwise configured to selectively parse or otherwise validate commands in the buffer to prevent otherwise inhibit security violations. In one specific embodiment, this privilege access check module can be carried out by assessing the security tokens inserted by the UMD, wherein the privilege access check module is configured to parse or otherwise validate only privileged commands but not non-privileged commands. The KMD can use the offset associated with non-privilege buffer sections to skip to the next buffer section. After KMD-based parsing/validation of the privileged buffer sections of the user-mode command buffer, the KMD can submit the workload to the GPU using a kernel-based command buffer which the KMD generates or otherwise derives from the user-mode command buffer. The format and structure of the kernel-mode command buffer may have a number of forms as will be appreciated in light of this disclosure. One example will be discussed with reference to FIG. 3.

In addition, the privilege access check module of the KMD can be further programmed or otherwise configured to tag batch buffers of the kernel-based command buffer as either privileged or non-privileged by allocating a field (e.g., "Non-Priv") in the batch buffer start command. Recall that the UMD provides indicators of where to break up the kernel-mode command buffer into privileged and non-privileged sections. Privileged kernel-mode command buffer sections are processed through the software-based KMD parser, and non-privileged kernel-mode command buffer sections are not parsed by the software-based KMD parser; rather, the non-privileged kernel-mode command buffer sections can be sent as-is to the GPU, in accordance with an embodiment. The format and structure of the batch buffer start command from the KMD to the GPU may have a number of forms as will be appreciated in light of this disclosure. One specific example embodiment will be discussed in turn with reference to FIGS. 4a-b.

Note that command buffers received from the UMD that, for whatever reason, do not include security tokens can still be processed by the KMD. For instance, in one embodiment, the KMD can be configured to proceed with normal software-based security parsing if no security tokens are found. Such a configuration would allow the system to accommodate both enhanced security parsing as described herein as well as legacy-based security parsing. In this sense, the system may accommodate multiple user-modes (e.g., legacy and hardware-assisted security parsing).

Figure 5:
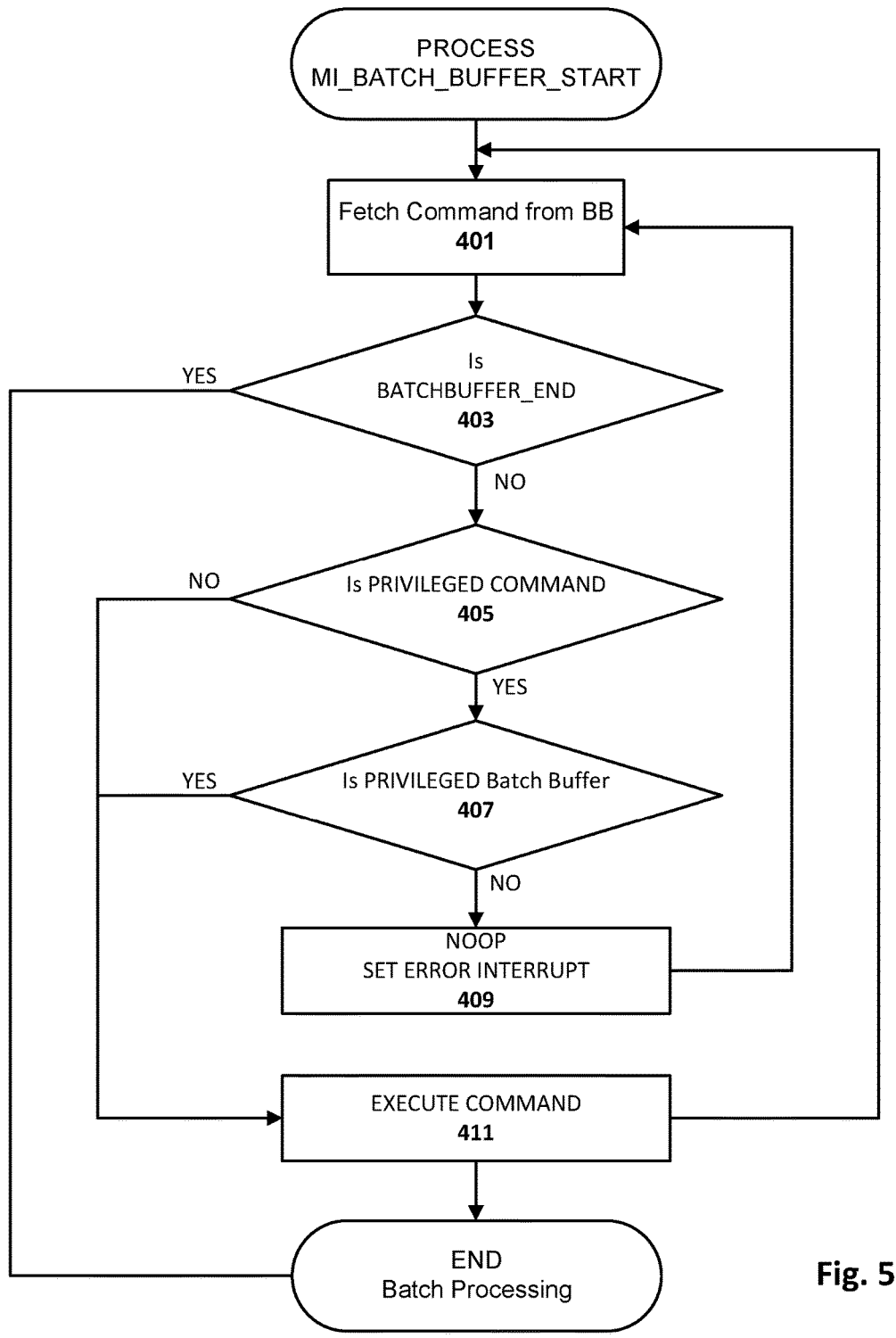
FIG. 5 illustrates a method by which a Graphics Processing Unit can process and execute privileged and non-privileged commands, in accordance with an embodiment of the present invention.

In some embodiments, the GPU is configured to receive the batch buffer start commands from the KMD, and to process the workload provided therein. In some such cases, the command execute module is programmed or otherwise configured to not allow any privileged command execution (e.g., such as writes to GGTT memory, updates to GGTT, MMIO writes, and other such privileged commands) from a non-privileged batch buffer. In some such embodiments, the command execute module is further configured to no place any restrictions on parsing privileged commands from privileged batch buffers, given that such commands were previously validated by the KMD. In accordance with one embodiment, if a privileged command is parsed in a non-privileged batch buffer, the command execute module of the GPU can be programmed or otherwise configured, for example, to flag a Command Privilege Violation Error and the offending command is dropped. The Command Privilege Violation Error can be logged, for example, in an error identity register of the command streamer, which in turn can be propagated as a Command Parser Master Error interrupt to other parts of the graphics processing system, if so desired. In some embodiments, the command execute module (or other module of the GPU) can be configured to assist in security parsing by NOOP-ing any illegal cmds from a non-privileged batch buffer. As will be appreciated in light of this disclosure, NOOP-ing refers to converting the illegal command to no operation, which causes the executing processor to move to the next sequential instruction thereby skipping the illegal command. FIG. 5 illustrates a method by which a GPU can process and execute privileged and non-privileged commands, in accordance with an embodiment of the present invention, and will be discussed in turn.

As will be appreciated in light of this disclosure, the various functional modules described herein can be implemented, for example, in any suitable programming language (e.g., C, C++, objective C, custom or proprietary instruction sets, etc), and encoded on one or more machine readable mediums, that when executed by one or more processors, carry out graphics command processing as described herein. Other embodiments can be implemented, for instance, with gate-level logic or an application specific integrated circuit (ASIC) or chip set or other such purpose built logic, or a microcontroller having input/output capability (e.g., inputs for receiving user inputs and outputs for directing other components) and a number of embedded routines for carrying out graphics workload processing. In short, the various functional modules can be implemented in hardware, software, firmware, or a combination thereof, and any such variation may be used in conjunction with a hardware-assisted security parsing scheme as described herein. One specific embodiment is implemented as a system-on-chip, which includes embedded KMD software routines and GPU hardware including that for providing a hardware assist for privilege access violation checks, for example.

User-Mode Command Buffer: UMD← →KMD

Figure 2:
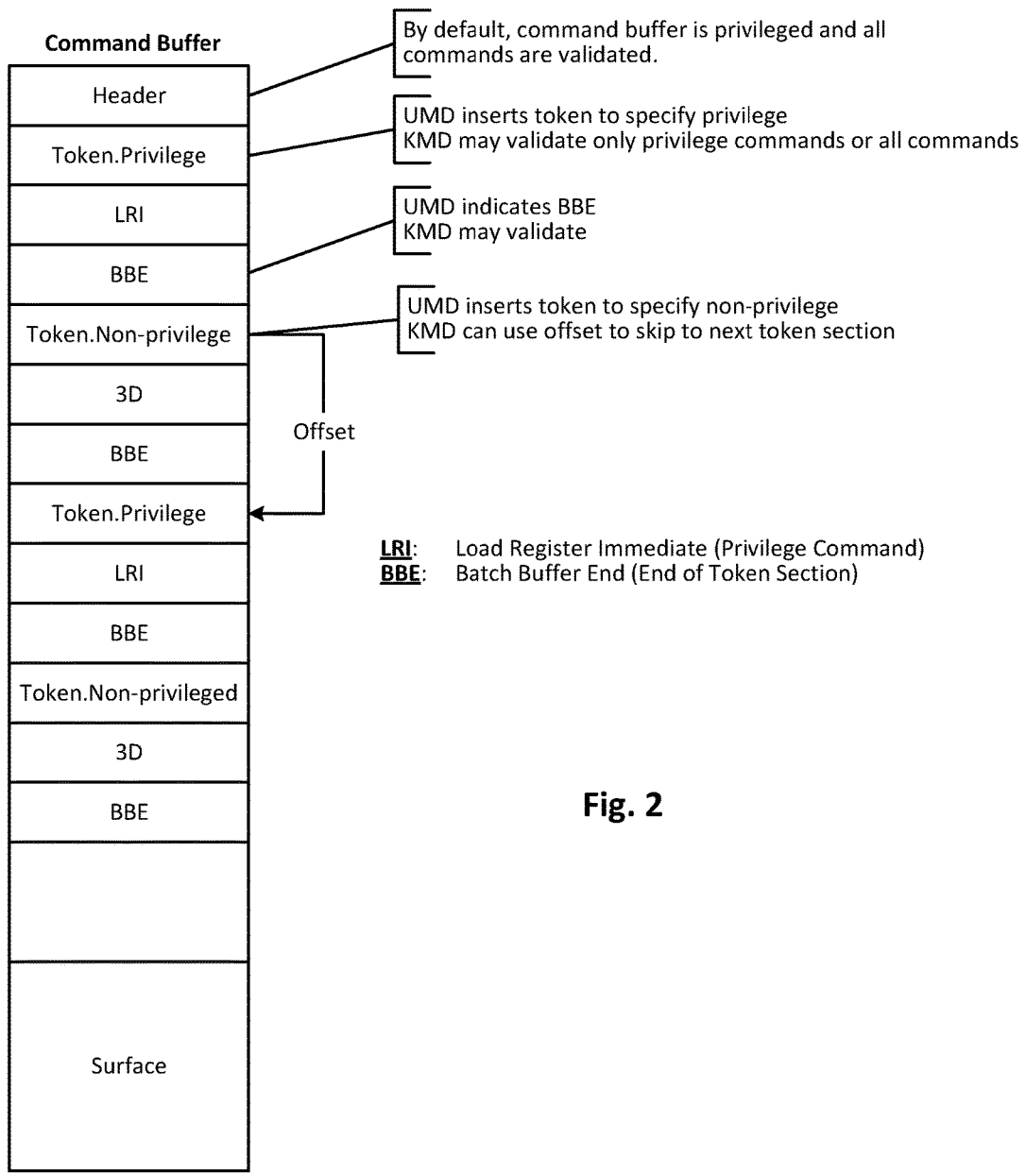
FIG. 2 illustrates user-mode command buffer configured in accordance with an embodiment of the present invention.

FIG. 2 illustrates user-mode command buffer configured in accordance with an embodiment of the present invention. This command buffer effectively defines the protocol that can be used between the UMD and KMD. As can be seen, the command buffer includes a header section, a number of privileged sections, and a number of non-privileged sections. The privileged and non-privileged sections can generally be referred to as token sections. Each token section includes a security token, one or more commands (privileged and/or non-privileged), and a batch buffer end (BBE). A command buffer section is treated as ended when the KMD encounters a BBE command. A section designated as privileged will have one or more commands that perform privileged function(s). A section designated as non-privileged must not have any commands that perform privileged function(s).

The security token indicates the privilege status of that section, and may further indicate an offset to the next security token to allow for efficient buffer processing. As can be seen, if one or more commands within a given command buffer section is privileged then the token indicates privilege (Token.Privilege), and if no command in the given command buffer section is privileged then the token indicates non-privilege (Token.Non-privilege). The batch buffer end indicates the end of that token section. The example command buffer shown includes two non-privileged token sections and two privileged token sections. As will be appreciated, other embodiments may include any number of token sections, including both privileged and non-privileged sections, or just privileged sections, or just non-privileged sections.

By default, the user-mode command buffer is set or otherwise assumed to be privileged and all commands are validated until designated otherwise by the UMD, in accordance with an embodiment. Other embodiments may have a different or no default scheme. In any such cases, the UMD can be programmed or otherwise configured to insert tokens to specify privilege, as previously explained. In the example embodiment of FIG. 2, the example command shown at the top is the LRI command (Load Register Immediate), which happens to be a privileged command. Of course, any number of other privileged commands could be used as well, and the claimed invention is not intended to be limited to any particular command set. Further note that the quantity or placement of the commands within the command buffer will vary from one embodiment to the next.

As can be further seen with reference to the example embodiment of FIG. 2, the UMD is further configured to indicate the command and the batch buffer end for each token section. Also in the example embodiment shown, and with respect to non-privileged tokens, the UMD is further configured to identify an offset to the next token section. As previously explained, the offset can be used, for example, to expedite a jump to the next command buffer section when conducting section analysis for purposes of validation. Other embodiments may not specify such an offset, depending on the desired performance. In still other embodiments, both privileged and non-privileged tokens may specify such an offset to facilitate section processing.

Once the command buffer sections are tagged by the UMD as privileged and/or non-privileged as previously explained, the KMD can use or otherwise exploit those tags to selectively execute validation of commands, in accordance with an embodiment of the present invention. Note that the UMD may provide a command buffer with security tokens to the KMD (e.g., as shown in FIG. 2) either directly or indirectly (by one or more intervening modules and/or components).

As previously explained, the KMD can be programmed or otherwise configured to receive the user-mode command buffer with security tokens, and to identify each distinct token section of the command buffer and selectively validate the various commands prior to passing those commands to the GPU. In one specific such embodiment, the KMD is configured to parse or otherwise validate only commands of privileged command buffer sections but not commands of non-privileged command buffer sections. In some such cases, for non-privileged token sections, the KMD can use the offset associated with that non-privilege token section to skip to the next token section, as shown in FIG. 2, thereby using most of the KMD-based processing time parsing commands of only privileged command buffer sections. Other embodiments may be configured to have the KMD validate non-privileged commands as well, if so desired, although such embodiments will generally implicate a higher degree of software-based security parsing. As will be appreciated in light of this disclosure, off-loading all or at least a portion of the software-based security parsing of non-privileged commands to the GPU (or other hardware-based security parsing entity) can greatly reduce processor cycle time and decrease power consumption.

Kernel-Mode Command/DMA Buffer: KMD← →GPU

Figure 3:
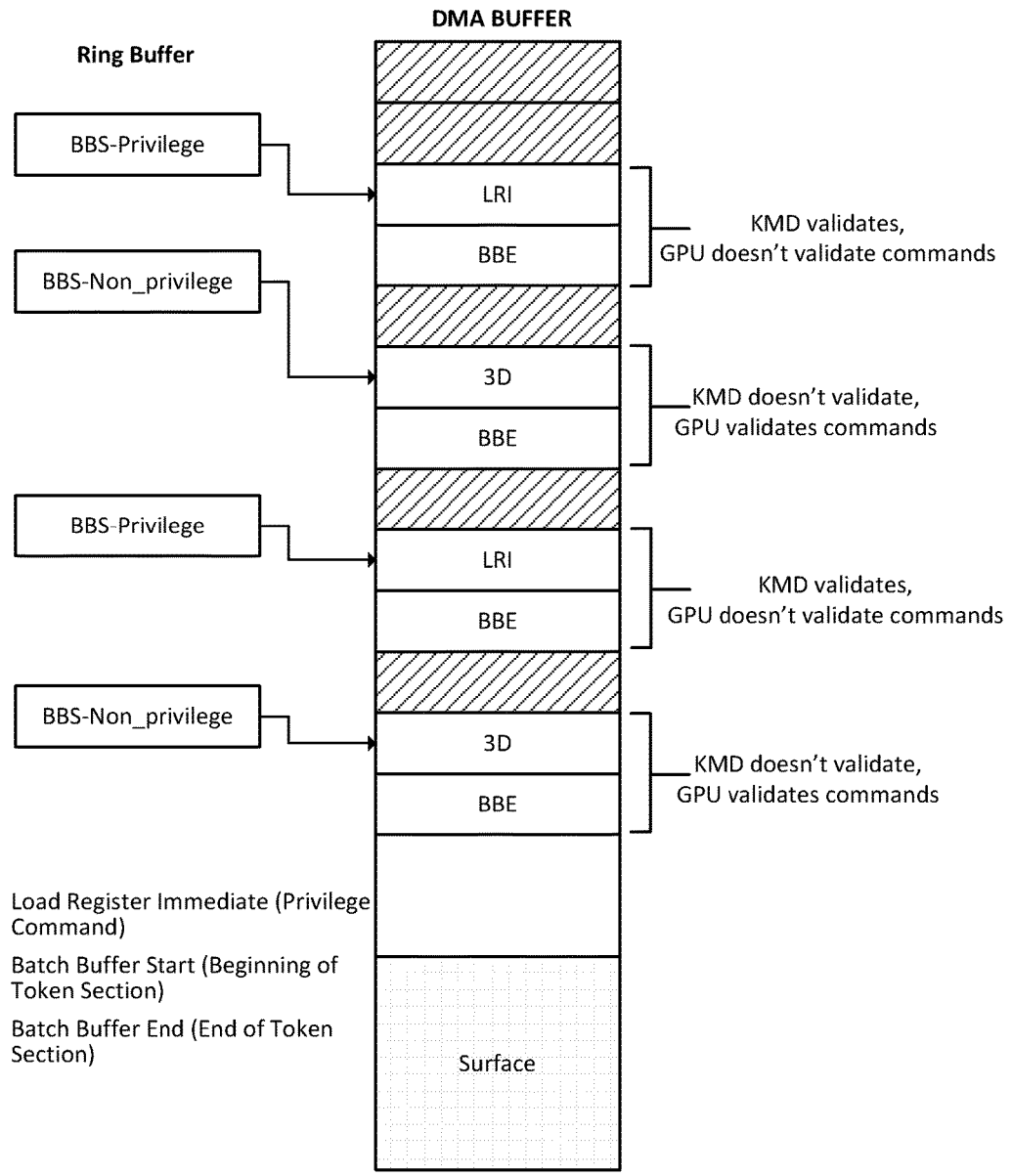
FIG. 3 illustrates kernel-mode command buffer configured in accordance with an embodiment of the present invention.

After KMD-based parsing/validation of the privileged token sections of the kernel-mode command buffer, the KMD can submit the workload to the GPU as batch buffers. This can be achieved using any number of suitable protocols. For instance, FIG. 3 illustrates an example kernel-mode command buffer configured in accordance with one embodiment of the present invention. This command buffer effectively defines the protocol between the KMD and the GPU. As can be seen, the sections of the command/DMA buffer can be validated by either the KMD or by the GPU, depending on the designated security (privileged or non-privileged) of each buffered command.

As can be further seen with reference to the example embodiment shown in FIG. 3, the KMD is configured to use multiple batch buffer start (BBS) commands in ring—one BBS command for each privileged/non-privileged section of the kernel-mode command buffer. Any number of buffer sections can be used (e.g., 4096 in some embodiments, but other embodiments may have fewer or more buffer sections, as will be appreciated in light of this disclosure). As can be further seen with reference to the example embodiment shown in FIG. 3, the KMD can be further configured to keep track of the kernel-mode command buffer sections between render time and submit time using, for example, a private direct memory access (DMA) area allocated for the render engine.

As previously noted, a subset of the user-mode commands are typically privileged. In accordance with an embodiment of the present invention, these commands may be issued only from a privileged batch buffer or directly from a ring buffer. If one of these commands is parsed in a non-privileged batch buffer, the GPU can be configured to flag a Command Privilege Violation Error and to NOOP or otherwise drop the offending command. In some embodiments, the command execute module of the GPU can effectively assist in security parsing by NOOP-ing any illegal cmds from a non-privileged batch buffer.

User-Mode Privileged Commands

As will be appreciated in light of this disclosure, the precision/granularity of what entails 'illegal' can be coarser such that not just those commands associated with unsafe registers can be flagged. For instance, any Load Register Immediate (LRI), Load Register with Register (LRR), Load Register from Memory (LRM), Store Register to Memory (SRM), etc, can all be declared as a NOOP. Table 1 illustrates example commands that can be NOOP-ed or otherwise given special treatment if privileged access is challenged by the GPU (e.g., command execute module), in accordance with an embodiment of the present invention.

TABLE 1

User-mode Privileged Commands

| User-mode Privileged Command | Function in non-privileged batch buffers |
| --- | --- |
| MI_UPDATE_GTT | Command is converted to NOOP |
| MI_STORE_DATA_IMM | Command is converted to NOOP if Use Global GTT is enabled |
| MI_STORE_DATA_INDEX | Command is converted to NOOP if Use Global GTT is enabled |
| MI_STORE_REGISTER_MEM | Command is converted to NOOP if Use Global GTT is enabled |
| MI_LOAD_REGISTER_MEM | Command is converted to NOOP |
| MI_BATCH_BUFFER_START | Command when executed from a batch buffer can set its "Privileged" level to its parent batch buffer or lower. Chained or Second level batch buffer can be "Privileged" only if the parent or the initial batch buffer is "Privileged". This is HW enforced. |
| MI_LOAD_REGISTER_IMM | Command is converted to NOOP. |
| MI_REPORT_PERF_COUNT | Command is converted to NOOP if Use Global GTT isenabled |
| PIPE_CONTROL | Still send flush down, Post-Sync Operation is NOOP if Use Global GTT is enabled. LRI Post-Sync Operation is NOOP. |
| MI_SET_CONTEXT | Command is converted to NOOP |
| MI_LOAD_REGISTER_REG | Command is converted to NOOP. |

Batch Buffer Start Command

FIGS. 4a-b illustrate a batch buffer start command that can be used to initiate the execution of commands stored a batch buffer, in accordance with an embodiment of the present invention. The command is generally referred to herein as MI_BATCH_BUFFER_START (Render). This command can be issued by the KMD to the GPU, and can be used to initiate the execution of commands stored in a batch buffer, such as the example KMD-based command buffer shown in FIG. 3. This specific example configuration includes a two double-word (DWord) command structure, with the first DWord shown in FIG. 4a and the second DWord shown in FIG. 4b. Numerous variations and other embodiments will be apparent in light of this disclosure, and the claimed invention is not intended to be limited to the particular example command structure shown.

As can be further seen, the first DWord of the command includes a number of fields, including: Command Type; Operation Code (Op Code); $2^{nd}$ Level Batch Buffer; Add Offset Enable; Predication Enable; Non-Privileged (Non- Priv); Batch Buffer Encrypted Memory Read Enable (BB Encrypted Mem Read Enable); Clear Command Buffer Enable; Resource Streamer Enable; Address Space Indicator; and Data Word Length (DWord Length). Default values may be assigned as desired, and any number of suitable formats can be used, as will be appreciated in light of this disclosure. Depending on the field sizes used and the length of the command, reserved fields may also be provisioned (e.g., to allow for further development, new functionality, etc).

The Command Type field allows for designation of a command type, and is allocated to bits 31:29 in this specific example. The Op Code field allows for designation of a command op code, and is allocated to bits 28:23 in this specific example. Such fields are commonly used to specify the given command. As previously explained, the command may be privileged or non-privileged.

The $2^{nd}$ Level Batch Buffer field allows for use of a second level batch head address storage element, and is allocated to bit 22 in this example. In more detail, and in accordance with one such embodiment, the command streamer contains three storage elements: one for the ring head address, one for the batch head address, and one for the second level batch head address. When performing batch buffer chaining, hardware of the system can be configured to update the head pointer of the first level batch address storage. There is no stack in hardware. When this bit is set, however, the system hardware uses the second level batch head address storage element. Upon MI_BATCH_BUFFER_END, the hardware will automatically return to the first (traditional) level batch buffer address, which effectively allows the system hardware to mimic a simple three level stack. Within a second level batch buffer, there cannot be any chained batch buffers. MI_BATCH_BUFFER_START command is not allowed inside a second level batch buffer. Thus, if the $2^{nd}$ level batch buffer field is reset to 0, then the system will place the batch buffer address in the first (traditional) level batch address storage element; and if the $2^{nd}$ level batch buffer field is set to 1, then the system will place the batch buffer address in the second level batch address storage element. Numerous variations and implementation details will be apparent in light of this disclosure. For instance, in accordance with some embodiments, an encrypted second level batch buffer cannot be called from an encrypted first (traditional) level batch buffer.

The Add Offset Enable field allows for specification of a batch buffer offset, and is allocated to bit 16 in this example. In accordance with one such specific example embodiment of the present invention, if this bit is set then the value stored in a batch buffer offset memory-mapped input/output register (e.g., BB_OFFSET MMIO register) can be added to the Batch Buffer Start Address and the summation can be used as the address to fetch from memory. The Predication Enable field can be used to enable predication of the corresponding command, and is allocated to bit 15 in this example. In accordance with one such specific example embodiment of the present invention, if this bit is set and the bit of interest in a given predicate result register is clear, then this command can be ignored. Otherwise, the command can be performed normally.

The Non-Privileged field allows the corresponding batch buffer to be specified as either of privileged or non-privileged, and is allocated to bit 13 in this example (e.g., if bit is reset batch buffer is privileged; if bit is set to 1 batch buffer is non-privileged). In accordance with one such specific example embodiment of the present invention, this designation can be irrespective of indications elsewhere, such as the Address Space Indicator set to GGTT or PPGTT (per-process graphics translation table), and next level (chained or second level) batch buffers called from parent/initial batch buffers can't have this field set to higher privilege level then parent/initial batch buffer. As known, a GGTT is a single common translation table used for all processes, but there can also be many PPGTT. As previously explained, privileged operations (e.g., such as any commands with memory type set to GGTT) are prohibited within non-privileged buffers, in accordance with an embodiment of the present invention. When a batch buffer start command is executed from within a batch buffer (meaning that command is a so-called "chained" or "second level" batch buffer command), the current active batch buffer's privilege status and this Non-Privileged field can be used to determine the privilege status of the batch buffer in the chain. In some cases, a chained or second level batch buffer can be in privileged or non-Privileged if the parent batch buffer is privileged, and a chained or second level batch buffer can only be non-privileged if the parent batch buffer is non-privileged. This can be enforced, for example, by hardware (e.g., GPU) as previously explained with reference to FIGS. 1 and 3. Hence, the hardware assist.

The Batch Buffer Encrypted Memory Read Enable field allows the batch buffer data to be encrypted, and is allocated to bit 12 in this example. In accordance with one such specific example embodiment, the command streamer can request batch buffer data from encrypted (e.g., serpent) memory if this bit is enabled. If disabled, then the batch buffer will be fetched from non-encrypted memory. In some such example cases, note that privileged commands may not be allowed from encrypted batch buffers and will be converted to NOOP commands in the command streamer. Any write that is generated from the encrypted batch buffer will write encrypted data.

The Clear Command Buffer Enable field allows the batch buffer to be flushed, and is allocated to bit 11 in this example. In accordance with one example such embodiment, the following batch buffer can be executed from a write-once protected memory area. The address of the batch buffer can be, for instance, an offset into a write-only phase change memory (WOPCM) area. In some such cases, if this bit is set, this batch buffer can be preceded by, for example, a flush command. The Resource Streamer Enable field allows the batch buffer to be executed by a resource streamer, and is allocated to bit 10 in this example. In accordance with one example such specific embodiment, when this bit is set, the resource streamer will execute the batch buffer, and when this bit is clear the resource streamer will not execute the batch buffer.

The Address Space Indicator field allows specification of memory from which to access batch buffer, and is allocated to bit 8 in this example (e.g., if bit is 0, then batch buffer can be accessed via GGTT, and if bit is 1 then batch buffer can be accessed via PPGTT). In accordance with one example such specific embodiment, software of the graphics processing system can be configured to ensure the Address Space Indicator of a chained batch buffer to be same as the initial batch buffer. For instance, if a given batch buffer start command executed from a ring buffer has the Address Space Indicator indicating a PPGTT then all subsequent chained batch buffers (not second level batch buffers) will also be in PPGTT. A second level batch buffer can select its Address space Indicator independent of the parent batch buffer. In some such specific example cases, this field can be set to 0 unless PPGTT is enabled. For a second level batch buffer, this field is not inherited from parent batch buffer and can be configured independently. For example, a batch buffer start command with its $2^{nd}$ Level Batch Buffer field set can have address space indicator set to GGTT/PPGTT irrespective of the Address Space Indicator of the batch buffer from which it is invoked.

The Dword Length field allows specification of command data word length, and is allocated to bits 7:0 in this example. If enabled, the second data word includes a Batch Buffer Start Address field allows specification of the starting address of the batch buffer, and is allocated to bits 31:2 of the second word in this example.

Methodology

FIG. 5 illustrates a method by which a GPU can process and execute privileged and non-privileged commands, in accordance with an embodiment of the present invention. As can be seen, the method generally is initiated by a batch buffer start (MI_BATCH_BUFFER_START) command issued from, for example, the KMD to the GPU. Thus, in some embodiments, the process may be executed, for example, on the GPU or other suitable kernel-mode hardware.

Once the BBS command is received, the process proceeds with fetching 401 the command from the batch buffer. As will be appreciated, the batch buffer may include more than one command, and if any one of those commands is privileged, then that batch buffer can be designated as privileged, in accordance with an embodiment. The process then continues with determining 403 if the command is a batch buffer end (BBE) command. If so, the process terminates. If, on the other hand, the command is not a BBE command, then the process continues with determining 405 if the command is privileged. If not, then the process continues with executing 411 the command.

If, on the other hand, the command is privileged, then the process continues with determining 407 if the batch buffer is privileged. If yes, then the process continues with executing 411 the command. On the other hand, if the batch buffer is not privileged, then the process continues with converting 409 the command to a NOOP, and may further include setting an error interrupt. Thus, the privilege access violation results in the command being discarded. The process then continues with fetching the next command from the batch buffer, which may be, for example, another application-based command or a batch buffer end (BBE) command. The process may continue for each command within a given batch buffer until batch processing for that particular batch is complete, and may repeat for each subsequent batch buffer start command received.

Example System

Figure 6:
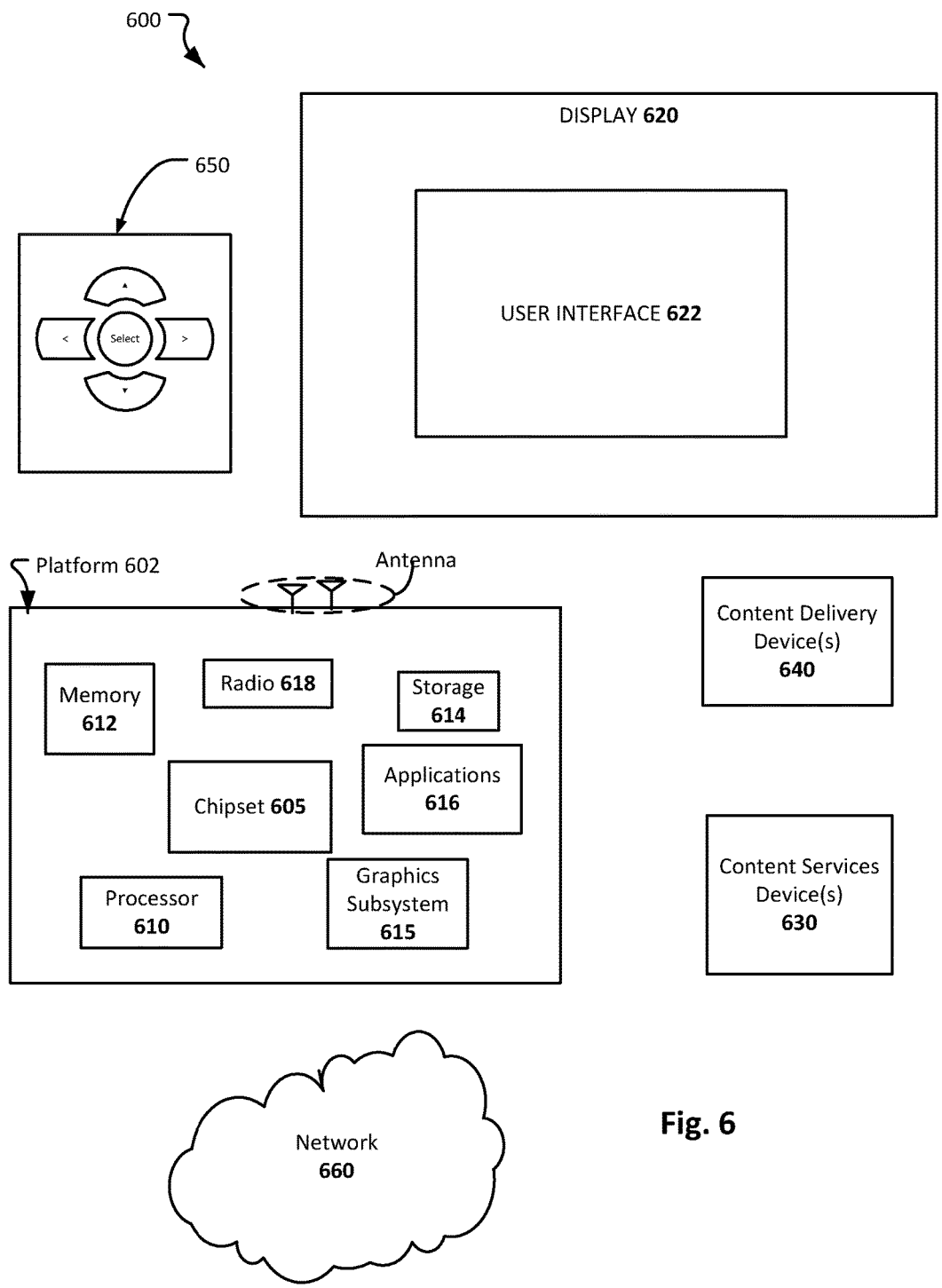
FIG. 6 illustrates a media system configured in accordance with an embodiment of the present invention.

FIG. 6 illustrates an example system 600 that may carry out hardware assist for privilege access violation checks as described herein, in accordance with some embodiments. In some embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques described herein may be implemented in various hardware architectures. For example, hardware assisted privilege access violation check functionality as provided herein may be integrated within a graphics and/or video chipset. Alternatively, a discrete security processor may be used. In still another embodiment, the graphics and/or video functions including hardware assist for privilege access violation checks may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Display 620 may comprise, for example, a liquid crystal display (LCD) screen, electrophoretic display (EPD or liquid paper display, flat panel display, touch screen display, television-like device, and/or a television. Display 620 may be digital and/or analog. In some embodiments, display 620 may be a holographic or three-dimensional display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the claimed invention. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the claimed invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

Figure 7:
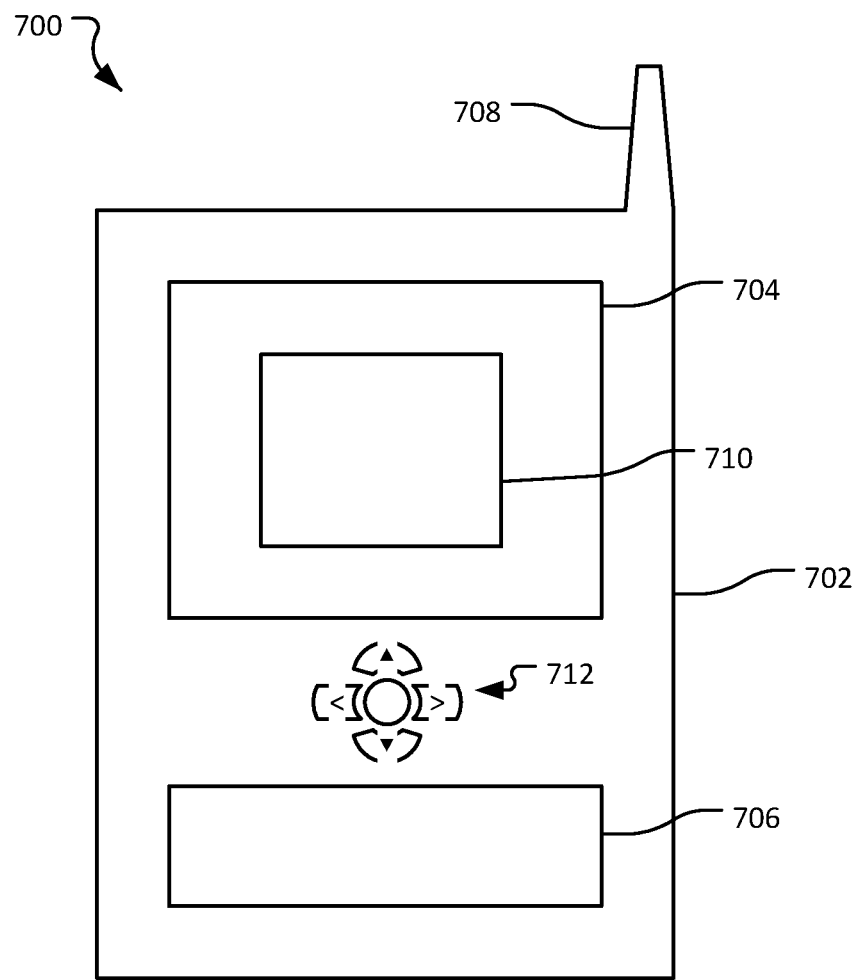
FIG. 7 illustrates a mobile computing system configured in accordance with an embodiment of the present invention.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present invention. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Numerous embodiments will be apparent, and features described herein can be combined in any number of configurations. One example embodiment of the present invention provides a device that includes a kernel-mode driver (KMD) configured to receive a command buffer having one or more buffer sections, each command buffer section having a command and designating whether that command is privileged or non-privileged. The KMD is further configured to selectively parse and validate one or more of the command buffer sections. The device further includes a graphics processing unit (GPU) configured to receive batch buffers from the KMD, each batch buffer having a command from the command buffer and designating whether that command is privileged or non-privileged. The GPU is further configured to disallow execution of any privileged command from a non-privileged batch buffer. In some cases, the device includes a user mode driver (UMD) configured to generate the command buffer received by the KMD. In some cases, at least one of the command buffer sections further designates an offset to a next section of the command buffer. In some cases, the KMD is configured to parse and validate only commands of command buffer sections designated as privileged, prior to issuing commands from those privileged sections in a batch buffer to the GPU. In one such case, the KMD is further configured to issue without parsing or validation all commands from a non-privileged command buffer section to the GPU in a batch buffer. In one such case, each command buffer section designated as non-privileged further designates an offset to a next section of the command buffer, and the KMD uses that offset to by-pass parsing commands from that non-privileged command buffer section. In some cases, any privileged commands from privileged batch buffers are unrestricted by the GPU. Numerous variations will be apparent. For instance, another embodiment provides a media processing system having a device as variously defined in this paragraph. Another example embodiment includes a mobile computing system that includes the media processing system. Another example embodiments provides a system-on-chip comprising the device as variously defined in this paragraph.

Another embodiment of the present invention provides media processing system. The system includes a user mode driver (UMD) configured to generate a command buffer having one or more buffer sections, each command buffer section having a command and designating whether that command is privileged or non-privileged. The system further includes a kernel-mode driver (KMD) configured to receive the command buffer from the UMD, and to parse and validate only commands of command buffer sections designated as privileged. The system further includes a graphics processing unit (GPU) configured to receive batch buffers from the KMD, each batch buffer having a command from the command buffer and designating whether that command is privileged or non-privileged. The GPU is further configured to disallow execution of any privileged command from a non-privileged batch buffer. In some cases, at least one of the command buffer sections further designates an offset to a next section of the command buffer. In some cases, the KMD is further configured to issue without parsing or validation commands from a non-privileged command buffer section to the GPU in a batch buffer. In some cases, each command buffer section designated as non-privileged further designates an offset to a next section of the command buffer, and the KMD uses that offset to by-pass parsing commands from that non-privileged command buffer section. In some cases, any privileged commands from privileged batch buffers are unrestricted by the GPU.

Another embodiment of the present invention provides a method that includes receiving rendering engine workload including one or more commands, and off-loading at least some security processing of the workload from software-based security parsing to hardware-based security parsing. In some cases, the receiving further includes receiving, via a kernel-mode driver (KMD), a command buffer having one or more buffer sections, each command buffer section having a command and designating whether that command is privileged or non-privileged. In one such case, the off-loading includes selectively parsing and validating, via the KMD, one or more of the command buffer sections. In another such case, the off-loading comprises at least one of parsing and validating, via the KMD, only commands of command buffer sections designated as privileged, prior to issuing commands from those privileged sections in a batch buffer to a graphics processing unit (GPU) for execution, and/or issuing without parsing or validation commands from a non-privileged command buffer section to the GPU in a batch buffer. In another such case, the off-loading includes receiving, via a graphics processing unit (GPU), batch buffers from the KMD, each batch buffer having a command from the command buffer and designating whether that command is privileged or non-privileged, and disallowing, via the GPU, execution of any privileged command from a non-privileged batch buffer. In one such example case, the off-loading further includes executing, by the GPU, any privileged commands from privileged batch buffers in unrestricted fashion. In another case, the method may include generating, via a user mode driver (UMD), the command buffer received by the KMD. In another example case, each command buffer section designated as non-privileged further designates an offset to a next section of the command buffer, and the off-loading includes using the offset to by-pass parsing commands from that non-privileged command buffer section.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A graphical processor unit (GPU) comprising:
   GPU hardware logic to execute a next command from a batch buffer in response to determining the next command is privileged and the batch buffer is privileged, wherein the batch buffer includes one or more commands, each of the one or more commands having a designation, the possible designations including privileged and non-privileged, and if any of the one or more commands from the batch buffer is privileged, then the batch buffer is designated as privileged; and
   GPU hardware logic to disallow execution of the next command in response to determining the next command is privileged and the batch buffer is non-privileged, including one or more of logic to convert the next command to a NOOP, logic to set an error interrupt, logic to set an error flag, logic to discard the next command, and/or logic to skip the next command.

2. The GPU of claim 1, further comprising:
   GPU hardware logic to execute the next command in response to determining the next command is non-privileged.

3. The GPU of claim 1, further comprising:
   GPU hardware logic to terminate processing of the batch buffer in response to determining that the next command is a batch buffer end (BBE) command.

4. The GPU of claim 3, wherein the GPU hardware logic to terminate processing of the batch buffer in response to determining that the next command is a BBE command is further to continue processing commands of the batch buffer until the BBE command is encountered.

5. The GPU of claim 1, wherein the GPU hardware logic to disallow execution of the next command in response to determining the next command is privileged and the batch buffer is non-privileged includes logic to convert the next command to a NOOP.

6. The GPU of claim 1, wherein the GPU hardware logic to disallow execution of the next command in response to determining the next command is privileged and the batch buffer is non-privileged includes logic to set an error interrupt.

7. A graphics card or chip set comprising the GPU of claim 1.

8. The GPU of claim 1, wherein the GPU hardware logic to execute the next command in response to determining the next command is privileged and the batch buffer is privileged is separate from the GPU hardware logic to disallow execution of the next command in response to determining the next command is privileged and the batch buffer is non-privileged.

9. A graphical processor unit (GPU) comprising:
GPU hardware logic to execute a next command from a batch buffer in response to determining the next command is non-privileged and the batch buffer is non-privileged;
GPU hardware logic to execute the next command in response to determining the next command is privileged and the batch buffer is privileged; and
GPU hardware logic to disallow execution of the next command in response to determining the next command is privileged and the batch buffer is non-privileged.

10. The GPU of claim 9, further comprising:
GPU hardware logic to terminate processing of the batch buffer in response to determining that the next command is a batch buffer end (BBE) command.

11. The GPU of claim 10, wherein the GPU hardware logic to terminate processing of the batch buffer in response to determining that the next command is a BBE command is further to continue processing commands of the batch buffer until the BBE command is encountered.

12. The GPU of claim 9, wherein the GPU hardware logic to disallow execution of the next command in response to determining the next command is privileged and the batch buffer is non-privileged includes logic to convert the next command to a NOOP.

13. The GPU of claim 9, wherein the GPU hardware logic to disallow execution of the next command in response to determining the next command is privileged and the batch buffer is non-privileged includes logic to set an error interrupt.

14. The GPU of claim 9, wherein the GPU hardware logic to disallow execution of the next command in response to determining the next command is privileged and the batch buffer is non-privileged includes logic to set an error flag.

15. The GPU of claim 9, wherein the GPU hardware logic to disallow execution of the next command in response to determining the next command is privileged and the batch buffer is non-privileged includes logic to discard the next command.

16. The GPU of claim 9, wherein the GPU hardware logic to disallow execution of the next command in response to determining the next command is privileged and the batch buffer is non-privileged includes logic to skip the next command.

17. A graphics card or chip set comprising the GPU of claim 9.

18. The GPU of claim 9, wherein the GPU hardware logic to execute the next command in response to determining the next command is non-privileged and the batch buffer is non-privileged and the GPU hardware logic to execute the next command in response to determining the next command is privileged and the batch buffer is privileged are separate from the GPU hardware logic to disallow execution of the next command in response to determining the next command is privileged and the batch buffer is non-privileged.

19. A graphics processing unit (GPU) configured to:
receive privilege-designated batch buffers from a kernel mode driver, the privilege-designated batch buffers including batch buffers designated as privileged and batch buffers designated as non-privileged;
disallow execution of any privileged command from a non-privileged batch buffer; and
allow execution of other commands, the other commands including privileged commands from a batch buffer designated as privileged, and non-privileged commands from a batch buffer designated as non-privileged.

20. The GPU of claim 19, wherein the GPU is further configured to terminate processing of a given batch buffer in response to determining that a given command of the given batch buffer is a batch buffer end (BBE) command, and continue processing commands of the given batch buffer until the BBE command is encountered.

21. The GPU of claim 19, wherein a privileged command from a non-privileged batch buffer is an offending command, and the GPU disallows execution of any privileged command from a non-privileged batch buffer by being configured to one or more of:
convert the offending command to a NOOP; set an error interrupt; set an error flag; discard the offending command; and/or skip the offending command.

22. A graphics card comprising the GPU of claim 19.

* * * * *